United States Patent [19]

Iggulden et al.

[11] Patent Number: 4,989,238
[45] Date of Patent: Jan. 29, 1991

[54] FACSIMILE RECORD AND PLAYBACK SYSTEM

[75] Inventors: Jerry R. Iggulden, Santa Clarita; Donald A. Streck, Ojai, both of Calif.

[73] Assignee: Light Ideas Incorporated, Woodland Hills, Calif.

[21] Appl. No.: 312,198

[22] Filed: Feb. 21, 1989

[51] Int. Cl.[5] ............................................ H04M 11/00
[52] U.S. Cl. ...................................... 379/100; 379/93; 379/96; 358/444
[58] Field of Search ........................... 379/100, 96, 93; 358/434, 444, 409, 443, 445, 435, 462

[56] References Cited

U.S. PATENT DOCUMENTS

| | | | |
|---|---|---|---|
| 4,058,672 | 11/1977 | Crager et al. ....................... | 358/435 |
| 4,729,033 | 3/1988 | Yoshida ................................ | 358/435 |
| 4,759,053 | 7/1988 | Satomi et al. ....................... | 379/100 |
| 4,796,091 | 1/1989 | Nohtomi .............................. | 358/444 |
| 4,816,911 | 3/1989 | Kirsch et al. ....................... | 379/100 |
| 4,829,559 | 5/1989 | Izawa et al. ......................... | 358/462 |
| 4,841,373 | 6/1989 | Asami et al. ........................ | 358/434 |
| 4,851,896 | 7/1989 | Muranaga et al. .................. | 358/443 |

Primary Examiner—Jin F. Ng
Assistant Examiner—Stella L. Woo
Attorney, Agent, or Firm—Donald A. Streck

[57] ABSTRACT

Facsimile record and playback apparatus for receiving and recording facsimile transmissions on a removable recording medium for later display and viewing. There is a cassette device and a record/playback deck for removably receiving the cassette device, for receiving data signals, for writing the data signals on the recording medium, for reading the data signals, and for providing the data signals at an output. A modem is connected for receiving facsimile transmissions. First logic is connected to the output of the modem for establishing a handshaking interface with a facsimile machine transmitting a facsimile, for receiving the facsimile transmission, for stripping off unnecessary transmission related information from document data information, for inserting control characters required for proper transcription at a later time, and for transmitting the control characters and document data information as data signals to the record/playback deck. There is a viewing device for presenting facsimile documents in a viewable form and second logic connected to the output of the record/playback device for receiving the data signals, for recognizing and separating the document data information and the control characters, and for formatting and outputting the document data information in combination with control information to the viewing device for viewing and reading thereof. The viewing device can be, inter alia, a computer, a printer, a display, or a facsimile machine.

43 Claims, 5 Drawing Sheets

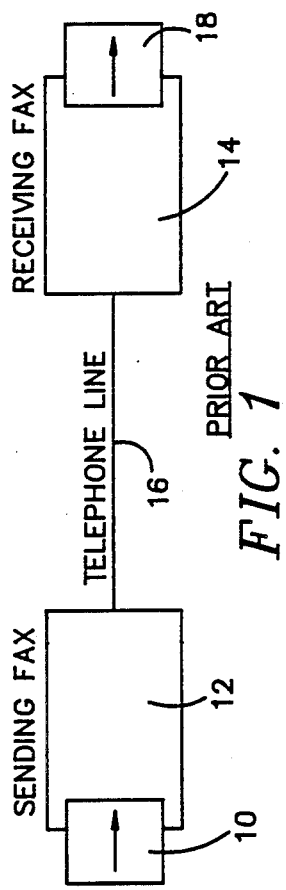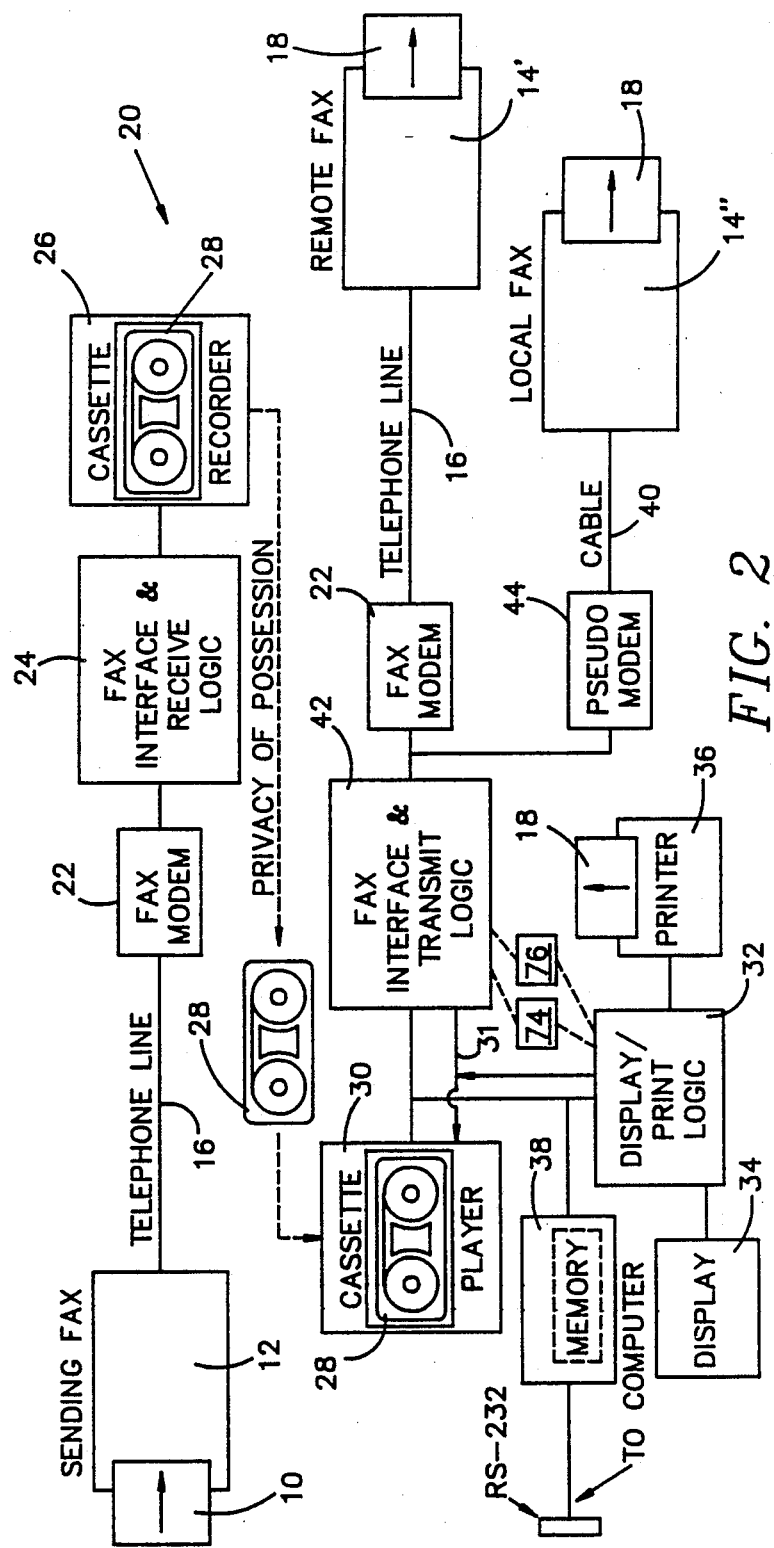

FACSIMILE RECORD AND PLAYBACK SYSTEM

BACKGROUND OF THE INVENTION

This invention relates to facsimile transmission systems and, more particularly, to facsimile record and playback apparatus for receiving and recording facsimile transmissions from a telephone line on a removable recording medium for later display and viewing comprising, a cassette device containing a recording medium; record/playback means for removably receiving the cassette device, for receiving data signals at an input thereof, for writing the data signals on the recording medium; for reading the data signals from a cassette device, and for providing the data signals at an output thereof; modem means connectable to the telephone line at an input thereof for receiving a facsimile transmission and for providing the facsimile transmission at an output thereof; first logic means connected to the output of the modem means for establishing a handshaking interface with a facsimile machine transmitting a facsimile on the telephone line, for receiving the facsimile transmission, for stripping off unnecessary transmission related information from document data information, for inserting control characters required for proper transcription at a later time, and for transmitting the control characters and document data information as data signals to the input of the recorder means, the first logic means including logic for performing the steps of, (1) outputting a start of message indicator to the input of the recorder means to be recorded on the cassette device whereby the start of each message on the cassette device can be found at a playback time, (2) when an incoming call from a sending facsimile machine is received, first staying in a loop to establish the necessary handshake interface with the sending machine, (3) when information from the sending machine begins to flow, looking to see if it has received document data related to the pixel content of a document being transmitted or interFAX communication data and if document data, proceeding to step (4), otherwise to step (5), (4) outputting document data to the input of the recorder means to be recorded on the cassette device and then proceeding to step (9), (5) striping non-document data from a stream intended for recording on the cassette device, (6) determining whether an internal control character as employed by transcription logic should be inserted and if not, proceeding to step (4), (7) providing appropriate control character(s) in the stream intended for recording on the cassette device and proceeding to step (4), (8) checking to see if the incoming transmission is finished and if not, returning to step (3), (9) outputting an end of message indicator to the input of the recorder means to be recorded on the cassette device, and

(10) terminating the interface with the sending facsimile machine in a normal manner and exiting;

viewing means for presenting facsimile documents in a viewable form; and, second logic means connected to the output of the record/playback means for receiving the data signals therefrom, for recognizing and separating the document data information and the control characters therefrom and for formatting and outputting the document data information in combination with control information derived from and reflecting the control characters to the viewing means whereby the facsimile as originally recorded from the telephone is presented in a manner for the viewing and reading thereof.

Facsimile (FAX) transmission systems are growing constantly in popularity for both personal and business use. FAX machines that cost $3000 a short time ago now sell for $1500 and are projected to be selling for $700 in the not too distant future. Even with such dramatic drops in price, the cost of a FAX machine is still too steep for many potential users. Many copy shops, and the like, now offer both sending and receiving FAX service for users who can not afford or justify their own FAX machine. This, of course, adds to the delay of receiving incoming FAX documents as there may be some time between the receipt of the FAX document by the receiving copy shop and their ability to track down and notify the intended recipient. While developing FAX protocol dictates that each transmission should have a cover sheet setting forth the intended recipient and the sender with specificity, many many transmissions do not include such information. Where the sender is unaware that the telephone number provided for FAX transmissions is not at the recipients location (being, in fact, at some service location) the indication of the recipient may be very sparse or lacking altogether. Once the recipient is located and informed that a FAX has arrived, arrangements must be made for the document to be paid for and picked up.

Within larger companies, the problem is similar. While the document may be in the right company, it may be difficult or impossible to find the recipient and deliver the document. There is also the problem of privacy and security. This problem exists for both the in-company recipient and the service location recipient. First, unlike the mail that arrives in an envelope, the typical prior art FAX transmission takes place as depicted in FIG. 1. The document 10 is loaded into the input hopper of the sending FAX machine 12. The receiving FAX machine 14 is then called over the telephone line 16. When a successful link has been established between the FAX machines 12, 14, the document 10 is scanned by the sending FAX machine 12 and the information sent to the receiving FAX machine 14 where the facsimile 18 (i.e. reproduction) thereof is printed out. As the facsimile 18 is printed out, it is available for viewing for anyone in the area interested in the contents thereof. There is no privacy and there is no security. In some instances, the receiving FAX machine 14 is provided with a physical or software key lock system whereby the facsimile 18 is stored in an internal memory and is not printed out until the recipient arrives with the key. This works after a fashion for high security systems; but, is impractical for the protection of everyday transmission within both the business and service location type of FAX installation.

Many FAX transmission are more akin to electronic mail then document transmission; that is, rather than play "telephone tag" trying to reach a recipient to give him/her a brief message (particularly by long distance or overseas with attendant time/language problems), the sender simply sends a FAX. In such instances, a hard copy of the "document" is not really needed and is a waste of paper. Rather than having the receiver (who is not the designated recipient in most cases) make a decision as whether to call or transmit the actual document, the usual decision is to send it. Service locations, of course, cannot call and give the message or they won't get paid. This need to send the document through company mail, or the like, also adds a considerable time delay between physical receipt of the message and its being transmitted to the intended recipient.

This problem could be solved if each person within a company routinely receiving FAX transmission had his/her own FAX machine. Even at the projected reduced price of $700, however, such an expenditure would not be practical for most companies.

There are also instances where business persons, for example, are away from their normal place of business and desire or need to receive a facsimile. Prior art devices classified as "portable" facsimile devices include both sending and receiving capability, are still large and cumbersome (being portable only by comparison to a standard facsimile machine), and are too expensive to make them generally available to large numbers of employees.

Wherefore, it is an object of the present invention to provide a simple way of receiving facsimile transmissions which provides privacy and security for recipient with respect to the contents thereof.

It is another object of the present invention to provide a simple way of receiving facsimile transmission which is at a cost level where individuals can afford to have the equipment and companies can afford to provide each person within a company routinely receiving FAX transmission had his/her own equipment.

It is yet another object of the present invention to provide a way of receiving facsimile transmission at any telephone with an inexpensive and portable device.

Other objects and benefits of the invention will become apparent from the detailed description which follows hereinafter when taken in conjunction with the drawing figures that accompany it.

SUMMARY

The foregoing objects have been achieved by the system of the present invention for receiving and recording facsimile transmissions from a telephone line on a removable recording medium for later display and viewing comprising, a cassette device containing a recording medium; recorder means for removably receiving the cassette device, for receiving data signals at an input thereof, and for writing the data signals on the recording medium; modem means connectable to the telephone line at an input thereof for receiving a facsimile transmission and for providing the facsimile transmission at an output thereof; first logic means connected to the output of the modem means for establishing a handshaking interface with a facsimile machine transmitting a facsimile on the telephone line, for receiving the facsimile transmission, for stripping off unnecessary transmission related information from document data information, for inserting control characters required for proper transcription at a later time, and for transmitting the control characters and document data information as data signals to the input of the recorder means.

The preferred system also includes viewing means for presenting facsimile documents in a viewable form; playback means for removably receiving the cassette device, for reading the data signals therefrom, and for providing the data signals at an output thereof; and, second logic means connected to the output of the playback means for receiving the data signals therefrom, for recognizing and separating the document data information and the control characters therefrom and for formatting and outputting the document data information in combination with control information derived from and reflecting the control characters to the viewing means whereby the facsimile as originally recorded from the telephone is presented in a manner for the viewing and reading thereof. Preferably, there are control means connected between the playback means and the second logic means for allowing the second logic means to control the reading of the data signals from the playback means.

In one possible embodiment, the viewing means is a digital computer and additionally, the second logic means includes third logic means including buffer memory and a connection to a data input of the computer for receiving the data signals and storing them in the buffer memory and for then transmitting the data signals to the computer for processing thereby into a viewable form.

In another possible embodiment, the viewing means is a display device and additionally, there are display memory means for holding a representation of the pixels comprising the lines of a display; and, the second logic means includes fourth logic means for receiving the data signals, for formatting and storing them in the display memory means, for recognizing when the display memory means contains information to be displayed, and for then transmitting the data signals to the display device for the displaying thereby in a viewable form.

In another possible embodiment, the viewing means is a dot printing device and additionally, there are line buffer means for holding a representation of the pixels comprising a line of information to be output to the dot printing device; and, the second logic means includes fifth logic means for receiving the data signals, for formatting and storing them in the line buffer means, for recognizing when the line buffer means contains a line of information to be printed, and for then transmitting the data signals to the printing device for the printing thereby into a viewable form. Preferably, the control means are also connected between the playback means and the fifth logic means for allowing the fifth logic means to control the reading of the data signals from the playback means whereby the printing device can operate at a printing speed which is much slower than the speed at which the data signals can be played back by the playback means. In another possible embodiment, the viewing means is a standard facsimile machine and additionally, there are line buffer means for holding a representation of the pixels comprising a line of information to be output to the facsimile machine; and, the second logic means includes sixth logic means connected a physical connection to the facsimile machine for calling and establishing a logical connection to the facsimile machine and for transmitting lines of information from the line buffer along with control information to the facsimile machine whereby the facsimile machine is led to believe it is receiving a facsimile being transmitted by another facsimile machine and receives and prints the document data information as a facsimile document. In this embodiment, preferably the control means are connected between the playback means and the sixth logic means for allowing the sixth logic means to control the reading of the data signals from the playback means.

In yet another embodiment, the standard facsimile machine is a remote machine and the physical connection to the facsimile machine comprises a standard facsimile modem connected to a standard telephone line. In another, the standard facsimile machine is a locally located machine and the physical connection to the facsimile machine comprises, an electrical cable including a "tip" and "ring" pair as in a telephone line and pseudo modem means connected to the facsimile machine by the cable for generating a calling signal on the cable to the facsimile machine whereby the facsimile machine answers the calling signal and believes it is connected to a transmitting standard facsimile machine over a telephone line.

Other possible additions to preferred embodiments include dialing means for dialing a telephone number onto the physical connection to the facsimile machine whereby to call and establish the logical connection to the facsimile machine as well as input means for receiving data output by an alpha-numeric keyboard facsimile generation device and for storing the data into the line buffer whereby the second logic means also outputs the data from the line buffer.

DESCRIPTION OF THE DRAWINGS

FIG. 1 is a simplified block diagram of a prior art facsimile transmission system.

FIG. 2 is a functional block diagram of the many possible features that can be implemented by the present invention.

DESCRIPTION OF THE PREFERRED EMBODIMENT

Figure 4:
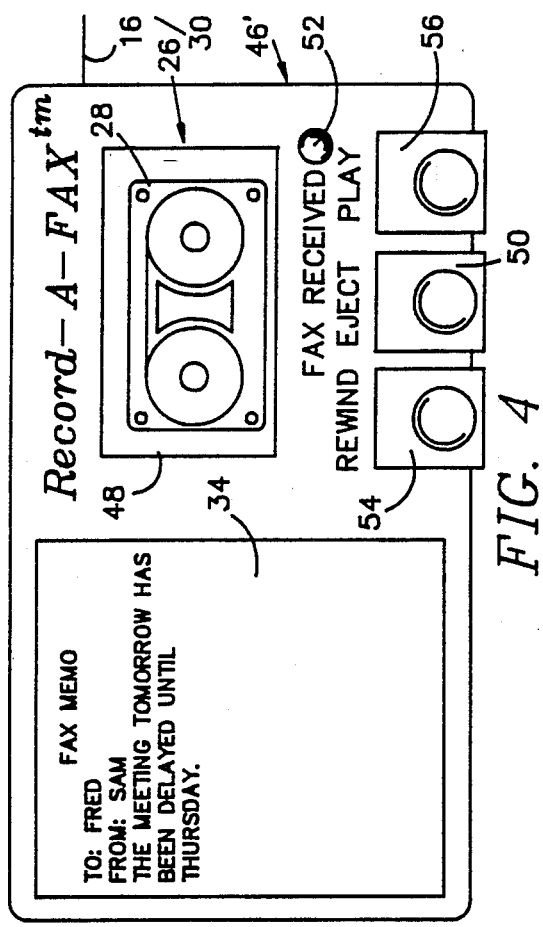
FIG. 4 is a drawing of a device according to the present invention for interfacing with a sending facsimile machine over the telephone line and recording the transmission from the sending facsimile machine on a microcassette cartridge in the manner of the basic device of FIG. 3 and for also displaying the contents of the cartridge for local review of the contents thereof.

The essence of the present invention is depicted in FIG. 2 where the entire system capability thereof is generally indicated as 20. The sending FAX machine 12 interfaces with a FAX modem 22 which, in turn, is controlled by FAX interface and receive logic 24. The FAX interface and receive logic 24 and modem 22 appear to the sending FAX machine 12 just like the prior art receiving FAX machine 14 of FIG. 1. Thus, when a document 10 is to be sent from the sending FAX machine 12, it calls the system 20 of this invention over the telephone line 16 in the usual manner. In other words, the system 20 of this invention is transparent to the sender and requires no special equipment or procedure from the sending end. Once the connection is made between the sending FAX machine 12 and the system 20, the document information as transmitted by the sending FAX machine 12 is stripped from the total transmission information (i.e. intermediate interFAX communications, protocols, etc. are removed) and the document information is stored on a removable recording medium in a recorder 26. In the preferred embodiment, the recorder 26 is a cassette type recorder of the micro cassette variety and the recording medium is a micro-cassette 28. Other types of recording devices could, of course, be employed if desired. The alternate preferred device by the inventors herein is a 3½ inch floppy drive of the type presently being employed with many personal and portable/laptop computers. As indicated in the drawing, the receipt of the information by the recipient is direct and there is the privacy of possession of the cassette 28. This means also that secure documents can be transmitted directly to the recipient who can then review the contents in an appropriate manner. With respect to the security aspects of facsimile transmission, in those instances where the security of the transmitted document needs to be retained when printed from data on the cassette 28 in any of the manners to be described hereinafter, it should be noted that the Hide-A-FAX™ procedure as described in co-pending application Ser. No. 312,700, filed Feb. 21, 1989 and entitled SECURITY FACSIMILE SYSTEMS, in which the inventors herein are co-inventors and the teachings of which are incorporated herein by reference, can be incorporated into the printout process so as to generate two copies of the document, each containing mutually exclusive unrecognizable portions thereof which require reconstruction by the intended recipient to render the document readable.

It should also be noted at this point that where the recording process is to be removed from the transcription process (as in the case where a small, portable, unit is to be carried in a briefcase, or the like, for use in receiving facsimiles in a hotel room or public telephone for later transcription, there may not be the ability to plug the FAX modem 22 interfacing with the FAX interface and receive logic 24 directly into a telephone line. In such cases, an acoustic coupler of any type well known in the art will have to be employed. Such devices and their use are, of course, well known and form no part of the novelty of this invention.

As further illustrated by the drawing of FIG. 2, once the recipient has the document information in his/her possession, there are many options available for its use depending on the environment and circumstances. By putting the cassette 28 in a player 30 and "playing" the cassette 28, the contents can be fed to display/print logic 32 and from there to a display 34 for viewing and/or to a printer 36 to produce a hard copy thereof. The display can be a small (e.g. 3 inch by 4 inch) display of the type employed with pocket model television sets and thereby provide a half-size (but still easily readable) display of the original document or, alternatively, by employing interface logic of a type well known in the art, the display could be made on a standard television set or CRT monitor. Likewise, while a laser or complex dot matrix printer could be employed for the printer 36 in some business applications, a very inexpensive (and probably much slower) single pin impact printhead or thermal printer could be employed where low cost is important and speed is secondary, such as in the home market. In such cases, it may be desirable to have the player 30 controlled by a control line 31 from the display/print logic 32. For this purpose, the use of a tape transport as employed in dictating equipment wherein the stopping, starting and rewinding of a cassette can be controlled electrically is preferred. As also indicated, as in our related co-pending application Ser. No. 293,015, filed Jan. 3, 1989 and entitled PIXEL-BASED ALPHA-NUMERIC COMMUNICATIONS SYSTEM WITH FACSIMILE INPUT INTERFACE, the output of the cassette 28 from the player 30 could be fed by logic/buffer memory 38 to a computer as by means of a serial RS-232 interface for use thereby. For example, the information could be printed out by the computer on its own associated printer or could be input to a desktop publishing system. For such uses, it might be preferred to employ the 3½ inch floppy disk system for recording the incoming FAX information as mentioned above. Then, the floppy drive of the computer could be employed as the player 30 and the logic/buffer memory 38 could be implemented in the computer and the serial interface eliminated.

Within a large company installation, obtaining a hard copy of a received document could be obtained through the use of standard FAX machines employed for transmission of facsimiles and shared by multiple employees desiring hard copies. Remembering the electronic mail (i.e. short message) aspects of FAX usage mentioned above, it can be appreciated that many received "documents" will never require hard copy generation once viewed on a local display. Where the "receiving" FAX machine 14′ is located elsewhere in the company at a remote location, it is called over the telephone line 16 in the usual manner to affect printout of the document. This, of course, could be an "inside" call from one extension to another. Where the "receiving" FAX machine 14″ is located close by and can be connected (switchably) by a cable 40, it is "called" in a slightly different manner to affect printout of the document. In either case, the transmission in conducted by FAX interface and transmit logic 42 which receives its input from the player 30. For a remote transmission, the FAX interface and transmit logic 42 outputs to a FAX modem 22 connected to the receiving FAX machine 14′ by telephone line 16. For a local transmission, the FAX interface and transmit logic 42 outputs to a pseudo modem 44 connected to the receiving FAX machine 14″ by cable 40 which includes a "tip" and "ring" pair as in a telephone line. When the pseudo modem 44 is "called" by the FAX interface and transmit logic 42, it generates a "ring" signal on the cable 40 which causes the receiving FAX machine 14″ to react in the same manner as when it is dialed over a normal telephone line. This pseudo modem/pseudo switchboard approach to interfacing with a FAX machine over a cable to affect interface with the FAX machine without resort to modification thereof is addressed further in our above-referenced patent application; the relevant teachings of which are incorporated herein by reference.

Figure 3:
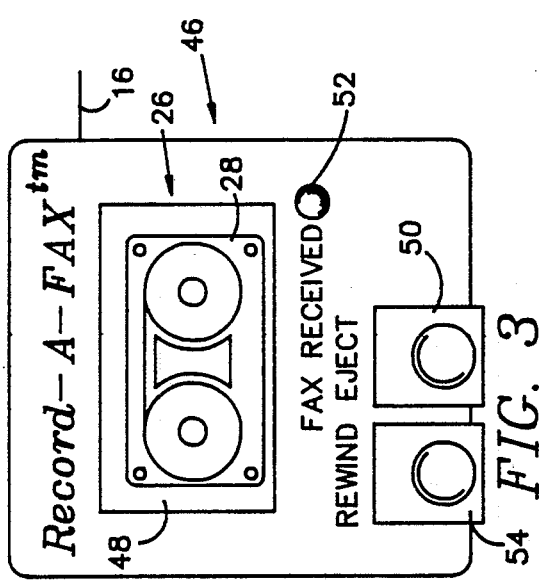
FIG. 3 is a drawing of a device according to the present invention for interfacing with a sending facsimile machine over the telephone line and for recording the transmission from the sending facsimile machine on a microcassette cartridge.

Turning now to FIGS. 3-6, several anticipated configurations of the present invention incorporating various ones and combinations of the features described with respect to FIG. 2 are shown by way of example. These various devices are anticipated to be available commercially soon under the name Record-A-FAX TM. The Record-A-FAX device 46 of FIG. 3 represents the basic receive element which could be provided in conjunction with each employee's telephone in a large company environment. It could also be employed for use out of the office as an extremely small and lightweight receive only device at any telephone as described above. By employing technology such as that of another co-pending application of the inventors herein (Ser. No. 170,380, filed Mar. 18, 1988, entitled SINGLE LINE COMPATIBLE FAX SYSTEM) in conjunction with the employee's telephone, each employee can have a private number for both voice and facsimile reception. As shown in FIG. 3, the Record-A-FAX device 46 is connected to the telephone line 16 and includes the recorder 26 which is loaded by placing the cassette 28 in the receiving door 48. The door 48 is opened by depressing the EJECT button 50 and closed by pressing down on the door 48 manually, as it typical for such record/playback devices as are well known in the art. An LED 52 is connected to be activated by the logic 24 when a document has been received. In this regard, this performance is similar to that employed in telephone answering machines. Such logic is well known to those skilled in the art and will not be described further in the interest of simplicity. Preferably, the Record-A-FAX device 46 includes a REWIND button 54 which will cause the cassette 28 to be rewound when depressed in a manner also well known to those skilled in the art.

A record and visually review Record-A-FAX device 46′ is depicted in FIG. 4. In addition to the features of the device 46 described above, the device 46′ includes a combined micro-cassette recorder/player mechanism of a type commercially available in dictating and transcription equipment, for example. Thus, it includes both the recorder 26 and player 30 functions in a single unit. There is also a PLAY button 56 which, when depressed, causes the cassette 28 to be played and the output therefrom to be input to the FAX display/print logic 32 as described above which then formats and displays the contents on the display 34 in half size as also described above. As will be readily appreciated, this embodiment could be made without the recording capability and simply used to visually review the contents of a received message on a cassette 28 to see if a hard copy is desired.

Figure 5:
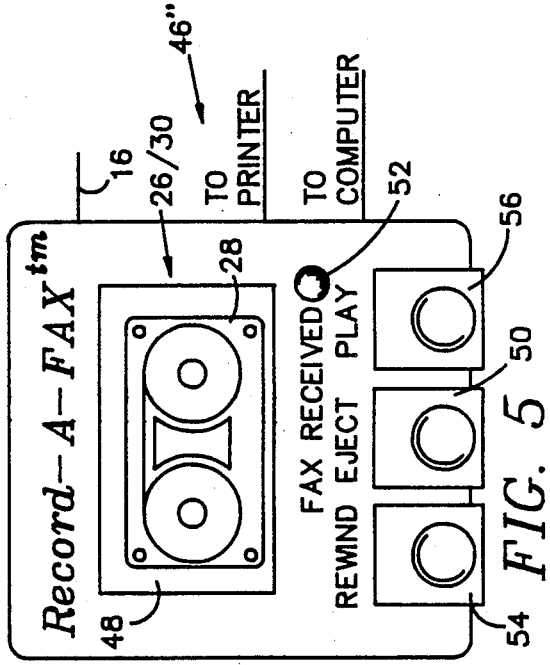
FIG. 5 is a drawing of a device according to the present invention for playing back the contents of the cartridge and for optionally sending it to a local printer for printing and/or to a computer for use thereby.

A record and print (and/or send to a computer) Record-A-FAX device 46″ is depicted in FIG. 5. In addition to the features of the device 46 described above, the device 46″ again includes a combined micro-cassette recorder/player mechanism and a PLAY button 56 as in the device 46′ of FIG. 4. When the PLAY button 56 is depressed in this device, it causes the cassette 28 to be played and the output therefrom to be input to the FAX display/print logic 32 as described above which then formats and prints the contents on a printer 36 connected thereto as also described above. Optionally, this device could also input the output of the cassette 28 to a computer as mentioned above. With respect to the printer, as mentioned earlier a very simple printer can be employed which sacrifices speed for low cost when low cost is important. It should also be noted at this point that the device 46" of FIG. 5 could also be built into a FAX machine or a computer as in integral part thereof. For example, a play-only device 46" integrated into a FAX machine could be connected to drive the printer portion thereof directly from the contents of a cassette 28 placed therein and played, thus eliminating the necessity of the logic 42 and modems 22, 44 of FIG. 2. In such case, a person receiving a facsimile on the device 46' of FIG. 4 and having determined from a visual review on the display 34 that a hard copy is desired, could obtain same by sending the cassette 28 to the nearest FAX machine containing the device 46" of FIG. 5 incorporated therein and having the cassette played to produce a hard copy.

Figure 6:
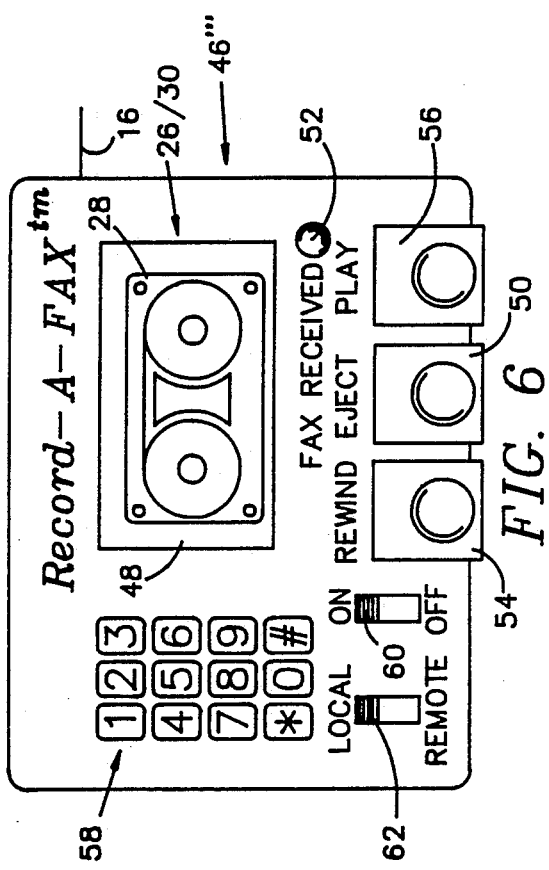
FIG. 6 is a drawing of a device according to the present invention for playing back the contents of the cartridge and for optionally sending it to a local facsimile machine by cable or to a remote facsimile machine by telephone line for printing.

In FIG. 6, a Record-A-FAX device 46''' is shown which has the features of the device 46" of FIG. 5 and, additionally, is set up to contain and interface with the logic 42 and modems 22, 44 of FIG. 2. Thus, it is intended for use in sending the contents of a cassette 28 to a local or remote receiving FAX machine 14", 14' for printing thereby. For this purpose, there is a dial pad 58 for inputting telephone numbers, an ON/OFF switch 60 for taking the unit "off hook" to get a dial tone (heard over a speaker, not shown), and a switch 62 for selecting between a LOCAL and a REMOTE receiving FAX machine 14", 14'.

Figure 7:
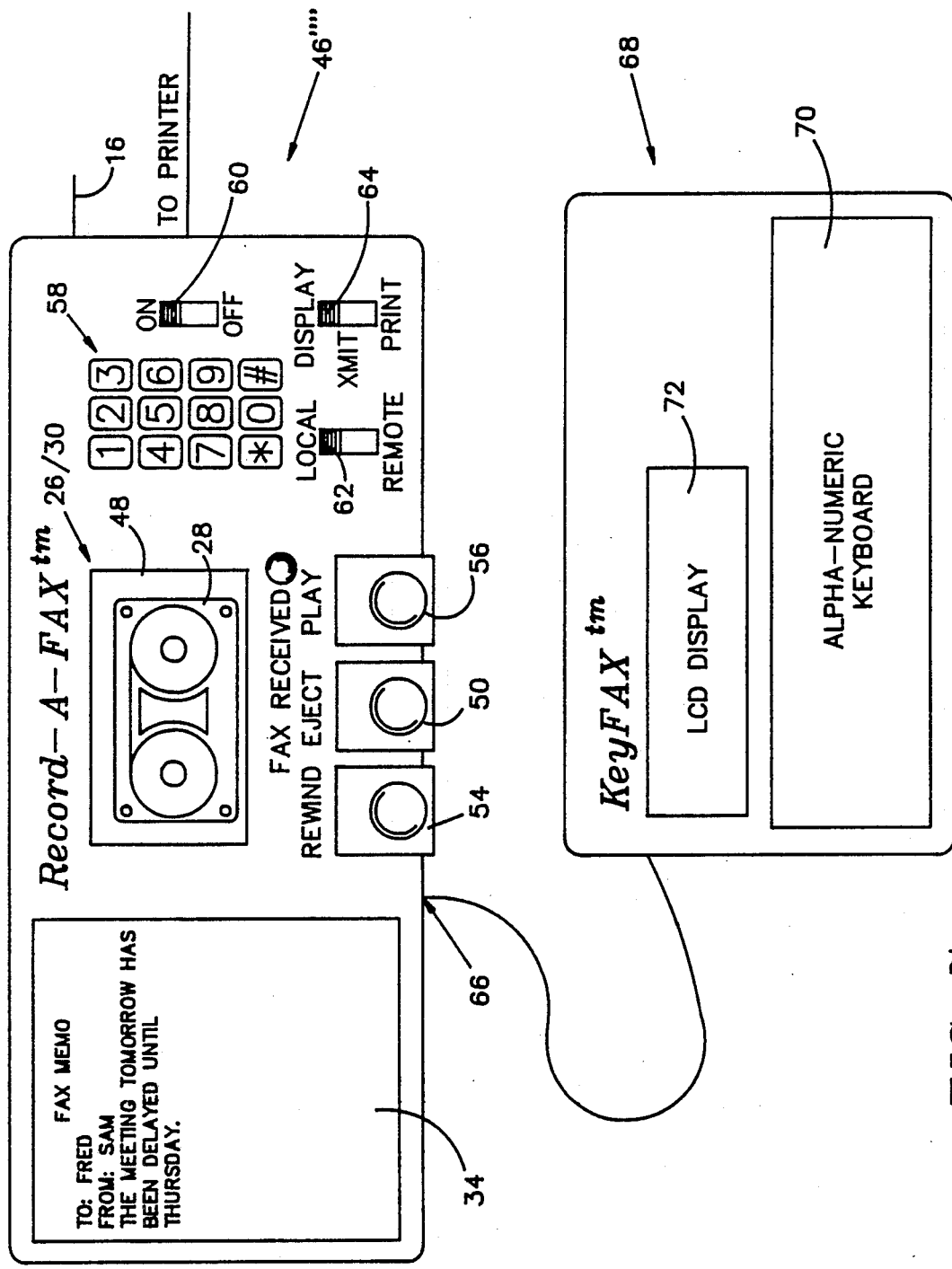
FIG. 7 is a drawing of a deluxe version of a device according to the present invention for interfacing with a sending facsimile machine over the telephone line and recording the transmission from the sending facsimile machine on a microcassette cartridge in the manner of the basic device of FIG. 3 and for also displaying the contents of the cartridge for local review of the contents thereof, playing back the contents of the cartridge and sending it to a local printer for printing, or for optionally sending it to a local facsimile machine by cable or to a remote facsimile machine by telephone line for printing.

A delux, all purpose, Record-A-FAX device 46'''' is depicted in FIG. 7. As can be seen and appreciated from the drawing figure, this unit includes most of the features of the various embodiments described above. In addition, there is a three position switch 64 for determining whether the output of the cassette 28 as played is to be displayed, printed, or transmitted to a local or remote FAX machine. Another addition is an input connection at 66 into which a KeyFAX TM device 68, as described in our co-pending application Ser. No. 254,925, filed Oct. 7, 1988 and entitled KEYBOARD TO FACSIMILE TRANSMISSION SYSTEM, can be plugged. As described in that application, the KeyFAX device 68 allows short messages to be typed in on an alpha-numeric keyboard 70 and edited by viewing on an LCD display panel 72 before being transmitted as a pseudo-paged facsimile document. In such an application, the KeyFAX device 68 would be stripped and configured to employ the FAX machine interface portions of the Record-A-FAX device 46'''' (e.g. dial pad 58, modem 22) so as to eliminate redundancy of parts and functions. The input from the KeyFAX device 68 would be stored by logic associated with the input connection 66 into a line buffer 76 to be output in a usual manner as will be described in detail shortly. By so doing, the Record-A-FAX device 46'''' and KeyFAX device 68, in combination would provide a user the ability to receive, review, and obtain a hard copy (where desired) of all facsimile transmissions in a private and secure manner, to transmit alpha-numeric messages to any FAX machine, and in general perform all the functions of an electronic mail system, all in a system that provides a small footprint on a desk (compared to a standard FAX machine, computer, or the like) and will sell at considerably less than the proposed bottom line price for standard FAX machines. If desired, the Hide-A-FAX capability referred to above can also be incorporated into the KeyFAX device 68 so as to transmit alpha-numeric messages through the Record-A-Fax device 46'''' in a secure manner.

As mentioned above and as will be readily appreciated by those skilled in the art, the various capabilities of the present invention as set forth by way of example above can be combined as best suits a particular need. As such combinations, of course, are within the scope and spirit of the invention as specifically set forth herein despite the fact that they are not specifically shown in the drawing figures or mentioned herein.

Figure 8:
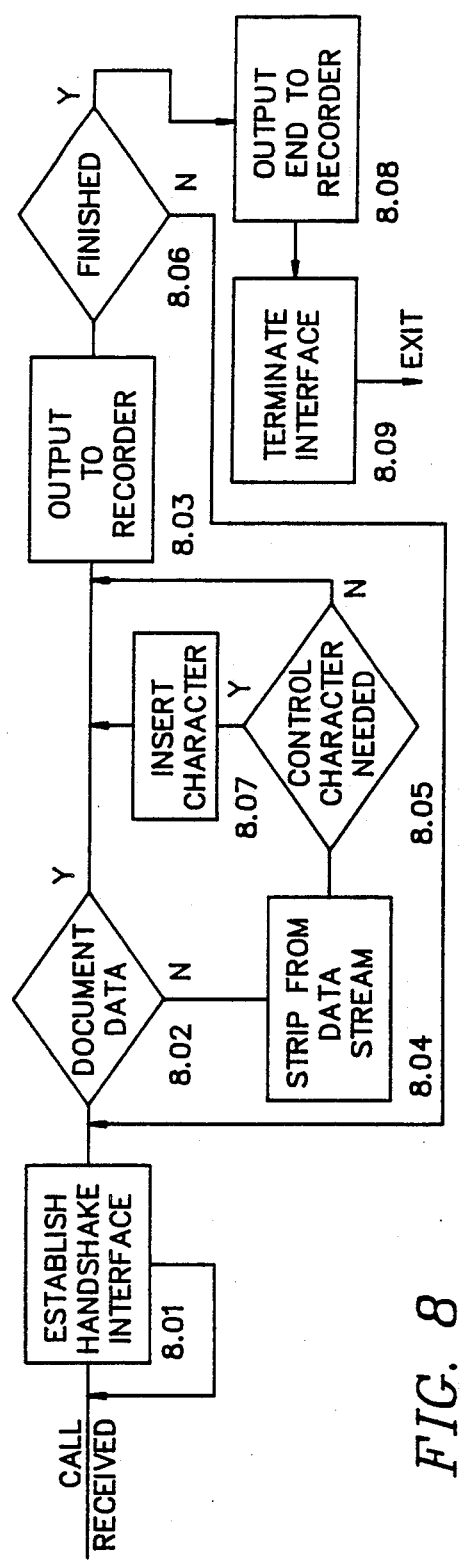
FIG. 8 is a flowchart of logic for the FAX interface and receive logic of this invention.

Having thus described various combinations of features and embodiments possible with the present invention, the logic to be implemented to accomplish those features will now be addressed in greater detail. In this regard, turning first to FIG. 8 logic to be accomplished by the FAX interface and receive logic 24 is shown in flowchart form. When an incoming call from a sending facsimile machine is received, the logic 24 first stays in a loop at block 8.01 establishing the necessary handshake interface with the sending machine. This procedure is well established industry convention and is well known to those skilled in the art and, therefore, will not be addressed in any further detail herein. Once the connection with the sending machine has been established, the flow of information from the sending machine begins to flow. At that point, the logic 24 at decision block 8.02 looks to see if it has document data (i.e. data related to the pixel content of the document being transmitted and such) or interFAX communication data. If it is document data, the logic 24 proceeds to block 8.03 where it outputs the data to the recorder 26 to be recorded on the cassette 28 thereby. While not specifically shown in the logic flowchart of FIG. 8, it should be noted in passing that in an actual implementation it may be desirable (and is preferred) to have the logic 24 output a start of message indicator to the cassette 28 so that the start of each message on the cassette 28 can be found at playback time. When non-document data is found by the logic 24 at decision block 8.02, at block 8.04 it strips this data from the input stream going to the recorder 26. At decision block 8.05 it determines whether an internal control character(s) as employed by the system's various transcription logic should be inserted. If not, the logic 24 goes to block 8.03. If the answer is yes, the logic 24 at block 8.07 provides the appropriate control character(s) and then goes to block 8.03 to cause the writing thereof to the cassette 28. At decision block 8.06. the logic 24 checks to see if it is finished with the incoming transmission. If not, it returns to block 8.02. If the answer is yes, at block 8.08 it outputs an end of message indicator to the cassette 28 so that the end of each message on the cassette 28 can also be found at playback time. At block 8.09 it then terminates the interface with the sending facsimile machine in the normal manner (also standard and well known in the art). At that point the logic 24 is finished and exits.

Figure 9:
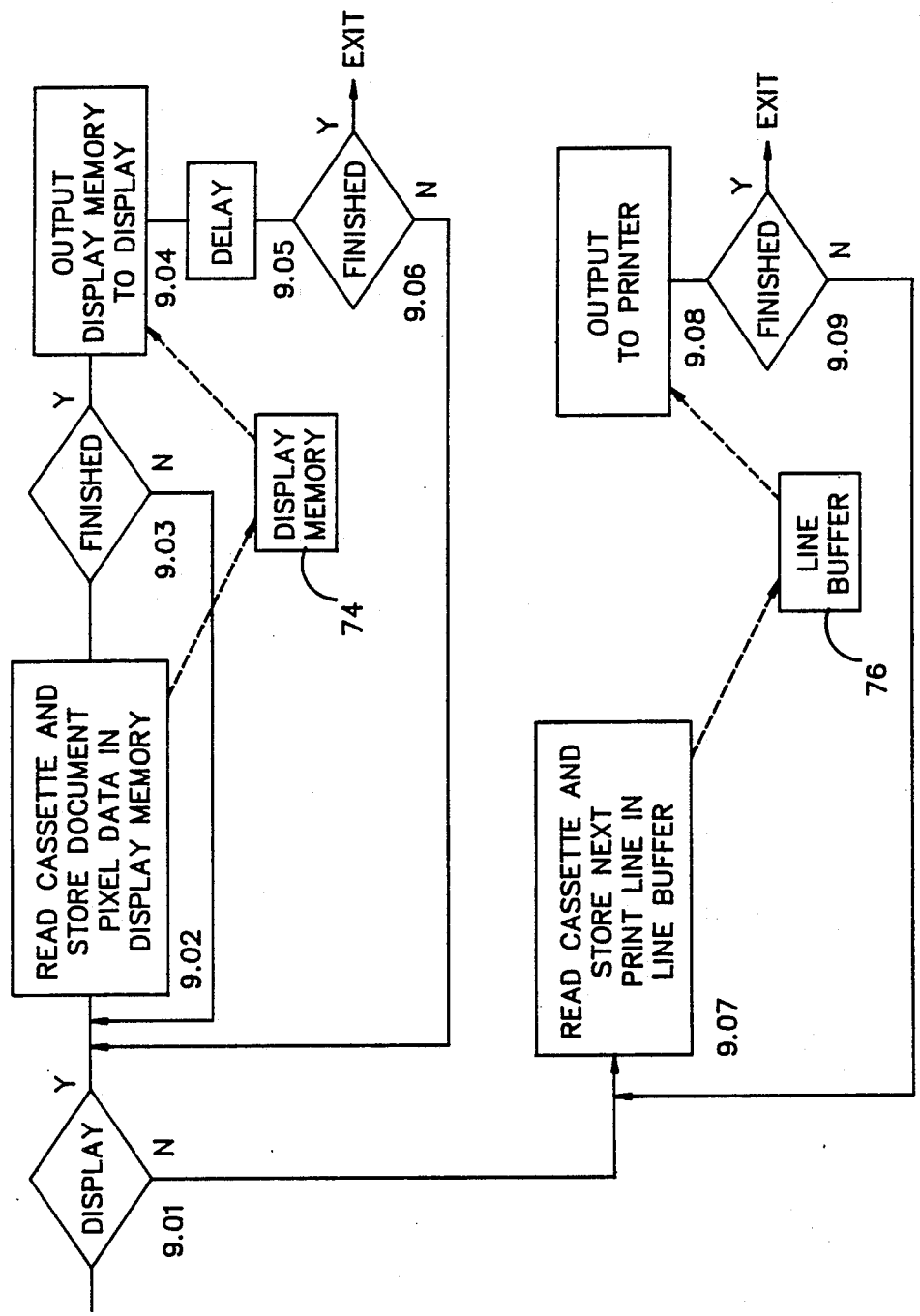
FIG. 9 is a flowchart of logic for the display/print logic of this invention.

The preferred display/print logic 32 is shown in flowchart form in FIG. 9. At decision block 9.01 thereof the logic 32 first determines whether this is a display or print request (as, for example, from the three position switch 64 of FIG. 7). If the data on the cassette 28 is to be displayed, at block 9.02 the logic 32 reads the next portion of the cassette 28 and stores the document pixel data derived therefrom (controlled by the control characters inserted by the logic 24 described above) into display memory 74. Display memory is preferred to be a typical display memory of the type well known in the art and employed in computer systems for holding a changeable picture of the display thereon an a pixel and line-by-line basis from which the display can be created and refreshed. At decision block 9.03 the logic 32 determines if it is finished (i.e. if the end of a "page" of the document as indicated by the inserted control characters and of a size which will fit on the display has been detected). If not, the logic 32 returns to block 9.02 to continue reading the cassette 28 and inputting data. When finished with a page, the logic 32 proceeds to block 9.04 where the contents of the display memory 74 are output to the display 34 in an appropriate manner for the display device employed. At block 9.05, the logic 32 logic delays (while continuing to refresh the display 34) until the user is through viewing the contents of the display 34 and indicates in an appropriate manner that the logic 32 is to proceed. At decision block 9.06, the logic 32 checks to see if there is more to process on the cassette 28. If there is (i.e. no end of message character was found), the logic 32 returns to block 9.02. When the last display page of the message has just been displayed, the logic 32 exits.

When the logic 32 finds at decision block 9.01 that it is has been requested to print the data (again as, for example, from the three position switch 64 of FIG. 7), it proceeds to block 9.07 where it reads the cassette 28 to obtain the next print line of pixel data, which it outputs to a line buffer 76. It should be noted that where the printer 36 employed cannot output at the same rate that the logic 32 can obtain and process data from the cassette 28 into the buffer 76 (which could be a rotary or "accordion" buffer of a type well known to those skilled in the art if the printer can keep up), the logic 32 employs the control line 31 to stop and start the reading of the cassette 28 by the player 30. When the line buffer 76 is full (as determined by the size of the lines and the control characters) the logic 32 at block 9.08 outputs the contents of the line buffer 76 to the printer 36. At decision block 9.09 it determines if it is finished (i.e. the end of message character has been found). If not, it returns to block 9.07, otherwise it exits.

Figure 10:
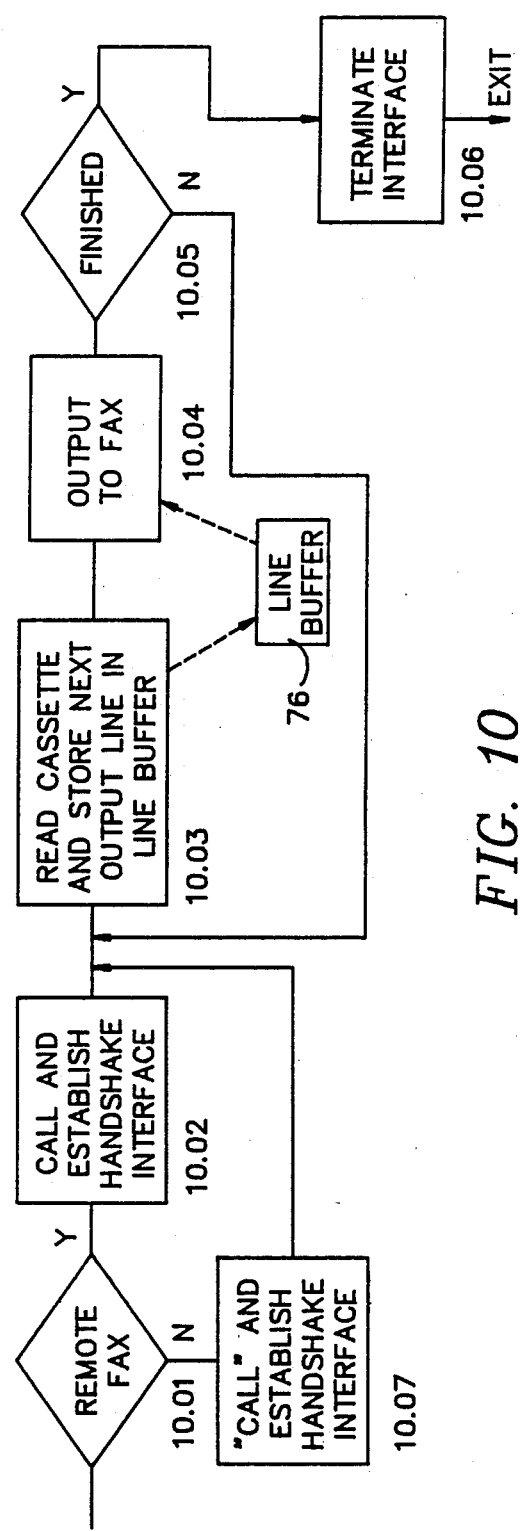
FIG. 10 is a flowchart of logic for the FAX interface and transmit logic of this invention.

A flowchart of the preferred FAX interface and transmit logic 42 appears in FIG. 10. At decision block 10.01 the logic 42 first determines whether it is to output to a remote facsimile machine 14' over the telephone line 16 or to a local facsimile machine 14" over a cable 40 (as depicted in FIG. 2 and as indicated, for example, by the switch 62 of FIG. 7). If remote, at block 10.02 the logic 42 calls the remote machine 14' over the telephone line 16 and establishes the usual handshake interface as described above. Using the control line 31 (which is preferred for closer control of the player 30), at block 10.03 the logic 42 reads the cassette 28 to obtain the next output line of pixel data and stores it in the line buffer 76 (which serves a dual purpose and, also, can be included within the display memory 74, if desired). When the line buffer 76 is full (just as in a standard facsimile machine which has just scanned a line of a document), at block 10.04 the logic 42 outputs the data from the buffer 76 to the facsimile machine (appending the necessary and expected standard interfacing control information, e.g. end of page, as necessary, in a manner well known in the art). At decision block 10.05, the logic 42 then checks to see if it is finished (i.e. the end of message character has been found). If not, the logic 42 returns to block 10.03. When finished, the logic 42 terminates the interface with the facsimile machine in the usual manner as mentioned above with respect to the logic 24 and then exits. In those instances where decision block 10.01 finds that it is to output to a local facsimile machine 14" over cable 40, it "calls" the machine 14" through the pseudo modem 44 to establish a connection and then performs the usual handshake interchange to affect an interface in the manner of block 10.02 as described above. Once the interface has been established, the connection operates in the normal manner and logic 42 proceeds to block 10.03 to employ the common logic described above.

Wherefore, having thus described our invention, what is claimed is:

1. A system for receiving and recording facsimile transmissions from a telephone line on a removable recording medium for later display and viewing comprising:
(a) a cassette device containing a recording medium;
(b) recorder means for removably receiving said cassette device, for receiving data signals at an input thereof, and for writing said data signals on said recording medium;
(c) modem means connectable to the telephone line at an input thereof for receiving a facsimile transmission and for providing said facsimile transmission at an output thereof; and,
(d) first logic means connected to said output of said modem means for establishing a handshaking interface with a facsimile machine transmitting a facsimile on the telephone line, for receiving said facsimile transmission, for stripping off unnecessary transmission related information from document data information, for inserting control characters required for proper transcription at a later time, and for transmitting said control characters and document data information as data signals to said input of said recorder means, said first logic means including logic for performing the steps of,
(d1) outputting a start of message indicator to said input of said recorder means to be recorded on said cassette device whereby the start of each message on said cassette device can be found at a playback time,
(d2) when an incoming call from a sending facsimile machine is received, first staying in a loop to establish the necessary handshake interface with the sending machine,
(d3) when information from the sending machine begins to flow, looking to see if it has received document data related to the pixel content of a document being transmitted or interFAX communication data and if document data, proceeding to step (d4), otherwise to step (d5),
(d4) outputting document data to said input of said recorder means to be recorded on said cassette device and then proceeding to step (d9),
(d5) striping non-document data from a stream intended for recording on said cassette device,
(d6) determining whether an internal control character as employed by transcription logic should be inserted and if not, proceeding to step (d4),
(d7) providing appropriate control character(s) in said stream intended for recording on said cassette device and proceeding to step (d4),
(d8) checking to see if the incoming transmission is finished and if not, returning to step (d3),
(d9) outputting an end of message indicator to said input of said recorder means to be recorded on said cassette device, and (d10) terminating the interface with the sending facsimile machine in a normal manner and exiting.

2. The system of claim 1 and additionally comprising:
(a) viewing means for presenting facsimile documents in a viewable form;
(b) playback means for removably receiving said cassette device, for reading said data signals therefrom, and for providing said data signals at an output thereof; and,
(c) second logic means connected to said output of said playback means for receiving said data signals therefrom, for recognizing and separating said document data information and said control characters therefrom and for formatting and outputting said document data information in combination with control information derived from and reflecting said control characters to said viewing means whereby said facsimile as originally recorded from the telephone is presented in a manner for the viewing and reading thereof.

3. The system of claim 2 and additionally comprising:
control means connected between said playback means and said second logic means for allowing said second logic means to control the reading of said data signals from said playback means.

4. The system of claim 2 wherein said viewing means is a digital computer and additionally comprising:
said second logic means including third logic means including buffer memory and a connection to a data input of said computer for receiving said data signals and storing them in said buffer memory and for then transmitting said data signals to said computer for processing thereby into a viewable form.

5. The system of claim 3 wherein said viewing means is a display device and additionally comprising:
(a) display memory means for holding a representation of the pixels comprising the lines of a display; and,
(b) said second logic means including fourth logic means for receiving said data signals, for formatting and storing them in said display memory means, for recognizing when said display memory means contains information to be displayed, and for then transmitting said data signals to said display device for the displaying thereby in a viewable form.

6. The system of claim 5 wherein said fourth logic means includes logic to perform the steps of:
(a) reading a next portion of said cassette device and storing document pixel data derived therefrom as controlled by control characters contained therein into said display memory means;
(b) determining if the end of a "page" as indicated by said control characters and of a size which will fit on said display device has been detected and if not, returning to step (a);
(c) outputting the contents of said display memory means to said display device in an appropriate manner for the type of said display device employed;
(d) delaying while continuing to refresh said display device from said display memory means until instructed by a user to proceed whereby said user has time to view the contents of said display device; and,
(e) checking to see if there is more to process on said cassette as indicated by the absence of a detected end of message character and proceeding to step (a) if there is, otherwise exiting.

7. The system of claim 2 wherein said viewing means is a dot printing device and additionally comprising:
(a) line buffer means for holding a representation of the pixels comprising a line of information to be output to said dot printing device; and,
(b) said second logic means including fifth logic means for receiving said data signals, for formatting and storing them in said line buffer means, for recognizing when said line buffer means contains a line of information to be printed, and for then transmitting said data signals to said printing device for the printing thereby into a viewable form.

8. The system of claim 7 and additionally comprising:
control means connected between said playback means and said fifth logic means for allowing said fifth logic means to control the reading of said data signals from said playback means whereby said printing device can operate at a printing speed which is much slower than the speed at which said data signals can be played back by said playback means.

9. The system of claim 7 wherein said fifth logic means includes logic to perform the steps of:
(a) reading said cassette device to obtain a next print line of pixel data;
(b) outputting said pixel data for said next print line to said line buffer means;
(c) when said line buffer means is full as determined by the size of lines of said printing device and the detection of control characters, outputting the contents of said line buffer means to said printer device; and,
(d) exiting if finished as indicated by the detecting of an end of message character, otherwise proceeding to step (a).

10. The system of claim 2 wherein said viewing means is a standard facsimile machine and additionally comprising:
(a) line buffer means for holding a representation of the pixels comprising a line of information to be output to said facsimile machine; and,
(b) said second logic means including sixth logic means connected a physical connection to said facsimile machine for calling and establishing a logical connection to said facsimile machine and for transmitting lines of information from said line buffer along with control information to said facsimile machine whereby said facsimile machine is led to believe it is receiving a facsimile being transmitted by another facsimile machine and receives and prints said document data information as a facsimile document.

11. The system of claim 10 and additionally comprising:
control means connected between said playback means and said sixth logic means for allowing said sixth logic means to control the reading of said data signals from said playback means.

12. The system of claim 10 wherein:
said standard facsimile machine is a remote machine and said physical connection to said facsimile machine comprises a standard facsimile modem connected to a standard telephone line.

13. The system of claim 10 wherein said standard facsimile machine is a locally located machine and said physical connection to said facsimile machine comprises:
(a) an electrical cable including a "tip" and "ring" pair as in a telephone line; and,
(b) pseudo modem means connected to said facsimile machine by said cable for generating a calling signal on said cable to said facsimile machine whereby said facsimile machine answers said calling signal and believes it is connected to a transmitting standard facsimile machine over a telephone line.

14. The system of claim 10 and additionally comprising:
dialing means for dialing a telephone number onto said physical connection to said facsimile machine whereby to call and establish said logical connection to said facsimile machine.

15. The system of claim 10 and additionally comprising:
input means for receiving data output by an alphanumeric keyboard facsimile generation device and for storing said data into said line buffer whereby said second logic means also outputs said data from said line buffer.

16. The method for receiving and recording standard facsimile transmissions from a telephone line on a removable recording medium for later display and viewing comprising:
(a) providing a cassette device containing a recording medium;
(b) providing a recorder for removably receiving the cassette device and for writing data signals on the recording medium;
(c) connecting a modem to the telephone line at an input thereof so as to receiving facsimile transmissions and provide them at an output thereof;
(d) establishing a handshaking interface with a facsimile machine transmitting a facsimile on the telephone line;
(e) receiving the facsimile transmission;
(f) stripping off unnecessary transmission related information from document data information;
(g) inserting control characters required for proper transcription at a later time;
(h) transmitting the control characters and document data information as data signals to the input of the recorder;
(i) outputting a start of message indicator to the input of the recorder to be recorded on the cassette device whereby the start of each message on the cassette device can be found at a playback time;
(j) when an incoming call from a sending facsimile machine is received, first staying in a loop to establish the necessary handshake interface with the sending machine;
(k) when information from the sending machine begins to flow, looking to see if document data has been received related to the pixel content of a document being transmitted or interFAX communication data and if document data, proceeding to step (l), otherwise to step (m);
(l) outputting document data to the input of the recorder to be recorded on the cassette device and then proceeding to step (q);
(m) striping non-document data from a stream intended for recording on the cassette device;
(n) determining whether an internal control character as employed by transcription logic should be inserted and if not, proceeding to step (l);
(o) providing appropriate control character(s) in the stream intended for recording on the cassette device and proceeding to step (l);
(p) checking to see if the incoming transmission is finished and if not, returning to step (k);
(q) outputting an end of message indicator to the input of the recorder to be recorded on the cassette device; and,
(r) terminating the interface with the sending facsimile machine in a normal manner and exiting.

17. The method of claim 16 and additionally comprising the steps of:
(a) providing viewing means for presenting facsimile documents in a viewable form;
(b) providing playback means for removably receiving the cassette device, for reading the data signals therefrom, and for providing the data signals at an output thereof; and,
(c) inserting a previously recorded cassette device into said playback means and playing the playback means to read the data signal from the cassette device;
(d) receiving the data signals there;
(e) recognizing and separating the document data information and the control characters therefrom; and,
(f) formatting and outputting the document data information in combination with control information derived from and reflecting the control characters to the viewing means whereby the facsimile as originally recorded from the telephone is presented in a manner for the viewing and reading thereof.

18. The method of claim 17 and additionally comprising the steps of:
(a) connecting control means to the playback means to control the movement of the cassette device therethrough; and,
(b) using the control means to control the reading of the data signals from the playback means.

19. The method of claim 17 wherein the viewing means is a digital computer and additionally comprising the steps of:
(a) providing a buffer memory;
(b) receiving the data signals and storing them in a buffer memory; and,
(c) transmitting the data signals to the computer for processing thereby into a viewable form.

20. The method of claim 17 wherein the viewing means is a display device and additionally comprising the steps of:
(a) providing a display memory for holding a representation of the pixels comprising the lines of a display;
(b) receiving, formatting, and storing the data signals in the display memory;
(c) recognizing when the display memory contains information to be displayed; and,
(d) transmitting the data signals to the display device for the displaying thereby in a viewable form.

21. The method of claim 20 wherein the steps thereof include the steps of:
(a) reading a next portion of the cassette device and storing document pixel data derived therefrom as controlled by control characters contained therein into the display memory;
(b) determining if the end of a "page" as indicated by the control characters and of a size which will fit on the display device has been detected and if not, returning to step (a);
(c) outputting the contents of the display memory to the display device in an appropriate manner for the type of the display device employed;
(d) delaying while continuing to refresh the display device from the display memory until instructed by a user to proceed whereby the user has time to view the contents of the display device; and,
(e) checking to see if there is more to process on the cassette as indicated by the absence of a detected end of message character and proceeding to step (a) if there is, otherwise exiting.

22. The method of claim 17 wherein the viewing means is a dot printing device and additionally comprising the steps of:
(a) providing a line buffer for holding a representation of the pixels comprising a line of information to be output to the dot printing device;
(b) receiving, formatting, and storing the data signals in the line buffer;
(c) recognizing when the line buffer contains a line of information to be printed; and,
(d) transmitting the data signals to the printing device for the printing thereby into a viewable form.

23. The method of claim 22 and additionally comprising:
(a) connecting control means to the playback means to control the movement of the cassette device therethrough; and,
(b) using the control means to control the reading of the data signals from the playback means whereby the printing device can operate at a printing speed which is much slower than the speed at which the data signals can be played back by the playback means.

24. The method of claim 22 wherein the steps thereof include the steps of:
(a) reading the cassette device to obtain a next print line of pixel data;
(b) outputting the pixel data for the next print line to the line buffer;
(c) when the line buffer is full as determined by the size of lines of the printing device and the detection of control characters, outputting the contents of the line buffer to the printer device; and,
(d) exiting if finished as indicated by the detecting of an end of message character, otherwise proceeding to step (a).

25. The method of claim 17 wherein the viewing means is a standard facsimile machine and additionally comprising the steps of:
(a) providing a line buffer for holding a representation of the pixels comprising a line of information to be output to the facsimile machine;
(b) providing a physical connection to the facsimile machine;
(c) using the physical connection to call and establish a logical connection to the facsimile machine; and,
(d) transmitting lines of information from the line buffer along with control information to the facsimile machine whereby the facsimile machine is lead to believe it is receiving a facsimile being transmitted by another facsimile machine and receives and prints the document data information as a facsimile document.

26. The method of claim 25 and additionally comprising the steps of:
(a) connecting control means to the playback means to control the movement of the cassette device therethrough; and,
(b) using the control means to control the reading of the data signals from the playback means.

27. The method of claim 25 wherein the standard facsimile machine is a remote machine and wherein:
(a) said step of providing a physical connection to the facsimile machine comprises connecting a standard facsimile modem connected to a standard telephone line; and,
(b) said step of using the physical connection to call and establish a logical connection to the facsimile machine comprises calling the facsimile machine by dialing the number of the facsimile machine through the facsimile modem.

28. The method of claim 25 wherein the standard facsimile machine is a locally located machine and wherein:
(a) said step of providing a physical connection to the facsimile machine comprises connecting an electrical cable including a "tip" and "ring" pair as in a telephone line between the facsimile machine and a pseudo modem; and,
(b) said step of using the physical connection to call and establish a logical connection to the facsimile machine comprises using the pseudo modem to generate a calling signal on the cable to the facsimile machine whereby the facsimile machine answers the calling signal and is mislead into believing it is connected to a transmitting standard facsimile machine over a telephone line.

29. The method of claim 25 and additionally comprising the step of:
providing dialing means for dialing a telephone number onto the physical connection to the facsimile machine whereby to affect said step of calling and establishing the logical connection to the facsimile machine.

30. Facsimile record and playback apparatus for receiving and recording facsimile transmission from a telephone line on a removable recording medium for later display and viewing comprising:
(a) a cassette device containing a recording medium;
(b) record/playback means for removably receiving said cassette device, for receiving data signals at an input thereof, for writing said data signals on said recording medium, for reading said data signals from a said cassette device, and for providing said data signals at an output thereof;
(c) modem means connectable to the telephone line at an input thereof for receiving a facsimile transmission and for providing said facsimile transmission at an output thereof;
(d) first logic means connected to said output of said modem means for establishing a handshaking interface with a facsimile machine transmitting a facsimile on the telephone line, for receiving said facsimile transmission, for stripping off unnecessary transmission related information from document data information, for inserting control characters required for proper transcription at a later time, and for transmitting said control characters and document data information as data signals to said input of said recorder means, said first logic means including logic for performing the steps of,
(d1) outputting a start of message indicator to said input of said recorder means to be recorded on said cassette device whereby the start of each message on said cassette device can be found at a playback time, (d2) when an incoming call from a sending facsimile machine is received, first staying in a loop to establish the necessary handshake interface with the sending machine, (d3) when information from the sending machine begins to flow, looking to see if it has received document data related to the pixel content of a document being transmitted or interFAX communication data and if document data, proceeding to step (d4), otherwise to step (d5), (d4) outputting document data to said input of said recorder means to be recorded on said cassette device and then proceeding to step (d9), (d5) striping non-document data from a stream intended for recording on said cassette device, (d6) determining whether an internal control character as employed by transcription logic should be inserted and if not, proceeding to step (d4), (d7) providing appropriate control character(s) in said stream intended for recording on said cassette device and proceeding to step (d4), (d8) checking to see if the incoming transmission is finished and if not, returning to step (d3), (d9) outputting an end of message indicator to said input of said recorder means to be recorded on said cassette device, and (d10) terminating the interface with the sending facsimile machine in a normal manner and exiting;

(e) viewing means for presenting facsimile documents in a viewable form; and, (f) second logic means connected to said output of said record/playback means for receiving said data signals therefrom, for recognizing and separating said document data information and said control characters therefrom and for formatting and outputting said document data information in combination with control information derived from and reflecting said control characters to said viewing means whereby said facsimile as originally recorded from the telephone is presented in a manner for the viewing and reading thereof.

31. The system of claim 30 and additionally comprising:
control means connected between said record/playback means and said second logic means for allowing said second logic means to control the reading of said data signals from said record/playback means.

32. The system of claim 30 wherein said viewing means is a digital computer and additionally comprising:
said second logic means including third logic means including buffer memory and a connection to a data input of said computer for receiving said data signals and storing them in said buffer memory and for then transmitting said data signals to said computer for processing thereby into a viewable form.

33. The system of claim 30 wherein said viewing means is a display device and additionally comprising:
(a) display memory means for holding a representation of the pixels comprising the lines of a display; and,
(b) said second logic means including fourth logic means for receiving said data signals, for formatting and storing them in said display memory means, for recognizing when said display memory means contains information to be displayed, and for then transmitting said data signals to said display device for the displaying thereby in a viewable form.

34. The system of claim 33 wherein said fourth logic means includes logic to perform the steps of:
(a) reading a next portion of said cassette device and storing document pixel data derived therefrom as controlled by control characters contained therein into said display memory means;
(b) determining if the end of a "page" as indicated by said control characters and of a size which will fit on said display device has been detected and if not, returning to step (a);
(c) outputting the contents of said display memory means to said display device in an appropriate manner for the type of said display device employed;
(d) delaying while continuing to refresh said display device from said display memory means until instructed by a user to proceed whereby said user has time to view the contents of said display device; and,
(e) checking to see if there is more to process on said cassette as indicated by the absence of a detected end of message character and proceeding to step (a) if there is, otherwise exiting.

35. The system of claim 30 wherein said viewing means is a dot printing device and additionally comprising:
(a) line buffer means for holding a representation of the pixels comprising a line of information to be output to said dot printing device; and,
(b) said second logic means including fifth logic means for receiving said data signals, for formatting and storing them in said line buffer means, for recognizing when said line buffer means contains a line of information to be printed, and for then transmitting said data signals to said printing device for the printing thereby into a viewable form.

36. The system of claim 35 and additionally comprising:
control means connected between said record/playback means and said fifth logic means for allowing said fifth logic means to control the reading of said data signals from said record/playback means whereby said printing device can operate at a printing speed which is much slower than the speed at which said data signals can be played back by said record/playback means.

37. The system of claim 35 wherein said fifth logic means includes logic to perform the steps of:
(a) reading said cassette device to obtain a next print line of pixel data;
(b) outputting said pixel data for said next print line to said line buffer means;
(c) when said line buffer means is full as determined by the size of lines of said printing device and the detection of control characters, outputting the contents of said line buffer means to said printer device; and,
(d) exiting if finished as indicated by the detecting of an end of message character, otherwise proceeding to step (a).

38. The system of claim 30 wherein said viewing means is a standard facsimile machine and additionally comprising:

(a) line buffer means for holding a representation of the pixels comprising a line of information to be output to said facsimile machine; and, (b) said second logic means including sixth logic means connected a physical connection to said facsimile machine for calling and establishing a logical connection to said facsimile machine and for transmitting lines of information from said line buffer along with control information to said facsimile machine whereby said facsimile machine is lead to believe it is receiving a facsimile being transmitted by another facsimile machine and receives and prints said document data information as a facsimile document.

39. The system of claim 38 and additionally comprising:

control means connected between said record/playback means and said sixth logic means for allowing said sixth logic means to control the reading of said data signals from said record/playback means.

40. The system of claim 38 wherein:

said standard facsimile machine is a remote machine and said physical connection to said facsimile machine comprises a standard facsimile modem connected to a standard telephone line.

41. The system of claim 38 wherein said standard facsimile machine is a locally located machine and said physical connection to said facsimile machine comprises:

(a) an electrical cable including a "tip" and "ring" pair as in a telephone line; and, (b) pseudo modem means connected to said facsimile machine by said cable for generating a calling signal on said cable to said facsimile machine whereby said facsimile machine answers said calling signal and believes it is connected to a transmitting standard facsimile machine over a telephone line.

42. The system of claim 38 and additionally comprising:

dialing means for dialing a telephone number onto said physical connection to said facsimile machine whereby to call and establish said logical connection to said facsimile machine.

43. The system of claim 38 and additionally comprising:

input means for receiving data output by an alphanumeric keyboard facsimile generation device and for storing said data into said line buffer whereby said second logic means also output said data from said line buffer.

* * * * *